United States Patent
Sisk et al.

(10) Patent No.: US 11,506,027 B1
(45) Date of Patent: Nov. 22, 2022

(54) WELL-BORE ENERGY STORAGE UNIT

(71) Applicant: Streamline Innovations, Inc., San Antonio, TX (US)

(72) Inventors: David Sisk, San Antonio, TX (US); Peter J. Photos, Boerne, TX (US)

(73) Assignee: Streamline Innovations, Inc., San Antonio, TX (US)

( * ) Notice: Subject to any disclaimer, the term of this patent is extended or adjusted under 35 U.S.C. 154(b) by 0 days.

(21) Appl. No.: 17/539,962

(22) Filed: Dec. 1, 2021

Related U.S. Application Data

(60) Provisional application No. 63/120,716, filed on Dec. 2, 2020.

(51) Int. Cl.
*E21B 41/00* (2006.01)

(52) U.S. Cl.
CPC .............................. *E21B 41/0085* (2013.01)

(58) Field of Classification Search
CPC ................................................. E21B 41/0085
See application file for complete search history.

(56) References Cited

U.S. PATENT DOCUMENTS

| | | | | |
|---|---|---|---|---|
| 2,296,981 | A * | 9/1942 | Chun | E21B 47/11 324/325 |
| 2,480,490 | A * | 8/1949 | Mark, Jr. | G01C 13/008 318/482 |
| 7,075,454 | B2 * | 7/2006 | Hirsch | E21B 17/028 340/854.6 |
| 10,087,731 | B2 * | 10/2018 | Grimes | E21B 43/30 |
| 10,199,659 | B2 * | 2/2019 | Navarro | H01M 50/553 |
| 10,443,333 | B2 * | 10/2019 | Grimsbo | E21B 29/02 |
| 10,753,180 | B2 * | 8/2020 | San Martin | E21B 47/01 |
| 11,072,999 | B2 * | 7/2021 | Ross | E21B 17/003 |
| 2022/0065231 | A1 * | 3/2022 | Colt | E21B 47/10 |

* cited by examiner

*Primary Examiner* — Jonathan Malikasim
(74) *Attorney, Agent, or Firm* — Jayne M. Saydah

(57) ABSTRACT

An energy storage device is formed in an earthen well and includes an outer tubular member disposed in the well and an inner tubular member disposed in the outer tubular member. Both the inner and outer tubular members may extend the length of the well. The inner tubular member is porous and includes a catholyte fluid disposed therein. The outer tubular member includes an anolyte fluid disposed therein. An anode terminal is located between the inner and outer tubular members and contacts an external surface of the inner tubular member. A cathode terminal is located in the inner tubular member and contacts the inner surface of the inner tubular member.

5 Claims, 1 Drawing Sheet

WELL-BORE ENERGY STORAGE UNIT

CROSS-REFERENCE

This application claims the benefit of priority to U.S. Provisional Application No. 63/120,716 filed on Dec. 2, 2021.

BACKGROUND OF THE INVENTION

1. Field of the Invention

The present invention relates to an earthen well-bore energy storage device. More specifically, it relates to the conversion of a bore in the earth to a battery storage device for electrical energy.

2. Description of the Related Art

The number energy sources supplying the electrical grid includes a growing percentage of cyclic and intermittent sources. Power generation sources such as a nuclear power plant, natural gas, co-generation facility, and a hydroelectric dam may be equipped to produce energy 24 hours/day. However, renewable and energy sources including but not limited to wind, solar and tidal energy are growing in number and do not supply steady streams of energy. Energy consumption is also a combination of cyclic and constant demand. More specifically, electric demand may be high during daylight hours due to industrial manufacturing being operational, daily workforce, and other daily activities. While there is still power demand at night, the demand may be much less than during the day.

To meet the cyclic and constant energy demand with the growing number of intermittent power sources, there is an increasing demand for power storage, prior to power distribution. For example, solar energy collected during daylight hours may be stored for distribution to meet the evening and overnight demand. Also, wind energy, which may be harnessed 24 hours/day, may be stored for use during periods of low wind or when wind energy may not be gathered. Tidal energy may be stored between the daily tidal events.

Large scale industrial battery facilities are among storage methods currently used on the electrical grid to store electricity. However, the capital and operating expenses associated with building and/or operating these storage methods are so high that reliance on renewable energy sources is much more expensive than nuclear power or natural gas. Additionally, the battery facilities require dedicated land usage which has undesirable environmental impacts.

Therefore, new facilities and methods of storing energy are needed to offset the intermittency of the energy production and meet the demands.

BRIEF SUMMARY OF THE INVENTION

In one aspect, the invention according to this disclosure is an energy storage device disposed in an earthen bore extending a first distance into earth. The device may include a bore-head inserted into the bore; an outer tubular member disposed in the bore, the outer tubular member surrounding an interior space, the outer tubular member forming a circumferential barrier between the interior space and the earth, and the outer tubular member extending at least the first distance into the earth; an inner tubular member disposed in the outer tubular member and extending the first distance, the inner tubular member being porous; a first liquid within the outer tubular member and external to the inner tubular member, the first liquid having a first charge; and a second liquid within the inner tubular member, the second liquid having a second charge being opposite the first charge.

In another aspect of the invention according to this disclosure, the inner tubular member may include an internal surface and an external surface, and the device may also include a first electrical terminal disposed in the first liquid and between the outer tubular member and the inner tubular member, and the first electrical terminal contacting the external surface of the inner tubular member; and a second electrical terminal extending into both the inner tubular member and the second liquid within the inner tubular member and the second electrical terminal contacting the inner surface of the inner tubular member.

Another aspect of the device, according to this disclosure, may include a first packer disposed in the upper portion of the bore-head; and a section of concrete disposed above the packers in the bore-head.

In yet another aspect of the device, according to this disclosure, the device may include a well casing extending into the bore and disposed between the outer tubular member and the earth, and the well casing may entirely surround the outer tubular member such that the outer tubular member is isolated from the earth.

In another aspect, of the device, according to this invention, the first and second electrical terminals are configured to permit connection to a power grid.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Also, as used herein, the words "connected" or "coupled" are each intended to include integrally formed members, direct connections between two distinct members without any other members interposed therebetween and indirect connections between members in which one or more other members are interposed therebetween. The terminology includes the words specifically mentioned above, derivatives thereof, and words of similar import.

Figure 1:
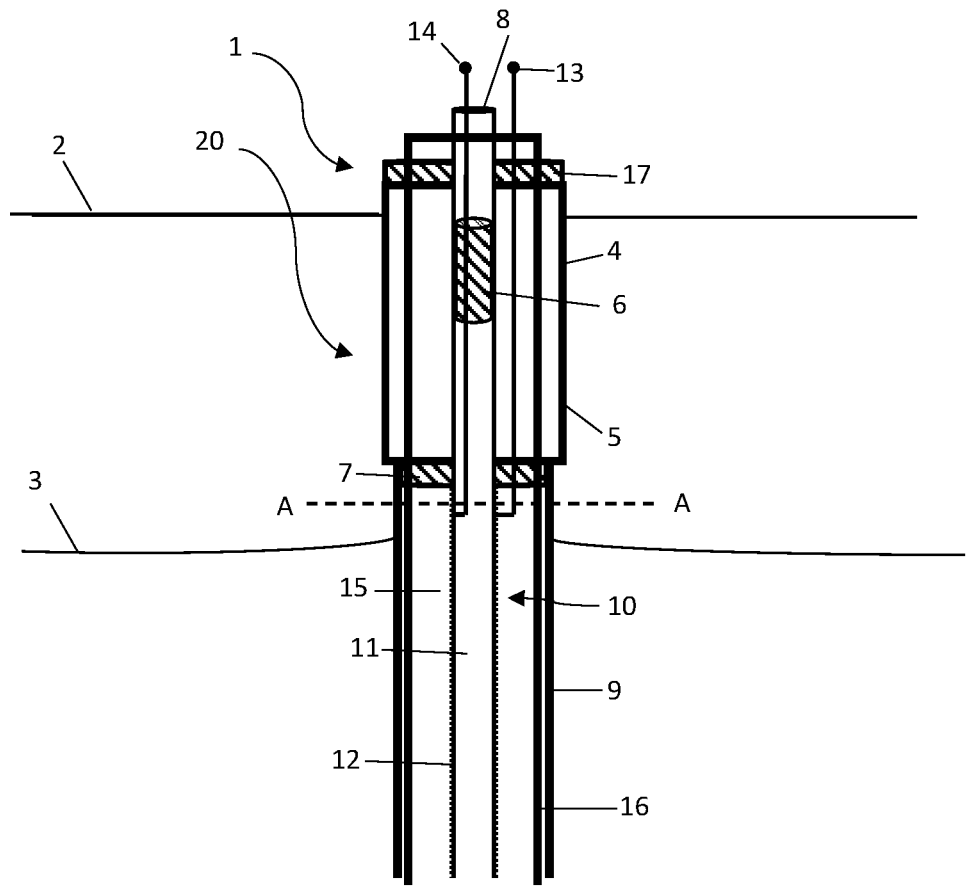
FIG. 1 depicts a side cross-sectional view of a preferred embodiment, according this disclosure, of a well or bore battery.

Referring now to the drawings in detail, wherein like numbers are used to indicate like elements throughout, there is shown in FIG. 1 is an embodiment of a battery or energy storage device 1 comprising an earthen bore 20, bore-head 5, a casing 9, an anode 13, a cathode 14, an outer tubular member 16, and an inner tubular member 8.

The earthen bore 20 may be an abandoned oil, gas or water well and/or the bore 20 may be drilled or otherwise formed to create the space 10 within the earth to form the battery 1. The bore may extend various distances into the earth through several miles and various geologic layers including the surface 2 and subsurface layer 3, etc.

Figure 2:
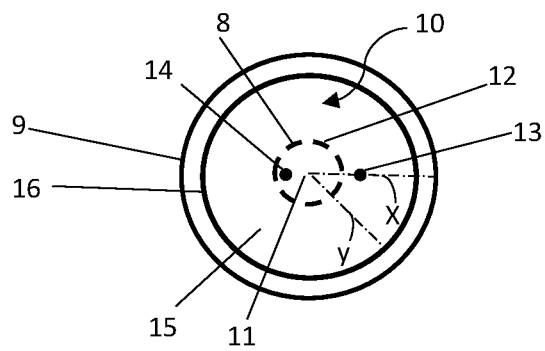
FIG. 2 depicts a top cross-sectional view along line A-A of FIG. 1.

The bore 20 may be lined with a tubular casing 9 that forms a barrier between the earth and space 10. In other words, the casing 9 may entirely surround and completely isolate the outer tubular member 16. Additionally, the casing 9 may extend the entire length of the bore and have a radius X, as shown in FIG. 2. The casing 9 is formed of a material, such as a metallic compound, plastic and/or ceramic, that is capable of forming a water and air tight barrier between the space 10 and the earth.

An outer member 16 is disposed within the casing 9 and may extend the length of the bore 20 and/or casing 9. The purpose of the outer member 16 is to protect the casing 9 from corrosion by the chemicals and/or materials used to form the batter. In the absence of the casing 9, the outer tubular member 16 may form a water and/or air tight and corrosion resistant barrier between the casing 9 and/or earth. The outer member 16 is tubular and may for example be a pipe or coil tubing having a diameter Y which is less than the diameter X of the casing 9. Although a space is shown between the casing 9 and outer member 16, the casing 9 and member 16 may abut and be substantially contiguous. Member 16 may be formed of materials that are resistant to corrosion by the chemicals and/or materials that are used in the battery 1. Some suitable examples may include stainless steel, plastics, fiber glass and/or ceramics.

Although not shown, the outer tubular member 16 may include a closed bottom that is configured to contain all of the anolyte fluid.

An inner tubular member 8 may be disposed within the outer tubular member 16, and the inner tubular member 8 also may extend the length of the outer member 16, bore 20 and/or casing. Essentially, member 8 serves as a porous barrier and/or membrane within the outer tubular member 16. Member 8 may be a non-porous material, such as a metallic compound, plastic or ceramic, with holes bored into the side walls and a porous membrane surrounding the member 8. Alternatively, member 8 may be formed entirely of a porous material capable of serving as membrane (i.e. a polyethylene and/or polypropylene) separating the two liquids of the battery 1.

Although not shown, the outer tubular member 16 and inner tubular member 8 may include closed bottoms configured to contain all of the anolyte fluid. Additionally, the outer tubular member 16 and inner tubular member 8 may extend the entire length of the bore 20 and substantially the equivalent lengths. Alternatively, it is foreseeable that the inner tubular member 8 may have a length that is less than the outer tubular member 16.

If the bore 20 is an abandoned oil well, the bore 20 may be capped with concrete 4 and packers 6, 7, 17. Packer 6 may be inside member 8 while packers 7, 17 maybe between member 8 and casing 9. The concrete 4 may rest on the packer 7 and extend to packer 17 at the upper portion of the well-head or bore-head 5. Once inserted into the well, outer tubular member 16 and inner tubular 9 may be suspended from the well head via packer 7 and/or packer 17.

The casing 9 defines an interior space 10, as shown in FIG. 2, that is divided into at least two longitudinal sections 11 and 15. Section 11 is contained within member 8, and section 15 is between inner tubular member 8 and outer tubular member 16. A cathode 14 and anode 13 are contained in sections 11 and 15, respectively, which may contact the porous and/or membranous member 8. Additionally, section 11 may include a catholyte fluid while section 15 may include an analyte fluid. The porosity and/or membranous structure of member 8, allow the catholyte and anolyte fluids to contact generating voltage and current flow in cathode 14 and anode 13.

It is noted that the casing 9 may extend the entire depth or distance of bore 20 or it may extend less than the entire length of the bore 20. Additionally, although not shown, the lower portion of the casing 9 may a sealed bottom that provides a water and air-tight seal from the bottom of the bore 20. Alternatively, if geologic and/or environmental conditions permit, it is foreseeable that the casing 9 may not have this type of bottom and may be open to the earth.

Cathode 14 and anode 13 are made of a metallic or other conductive material. Using these terminals, the battery 1 may be connected to power grid or another electricity user or generator, and energy may be added for storage and later extracted for use.

Various types of fluids (i.e. liquid and/or gels) may be utilized for the catholyte and anolyte. Typically, these fluids may be electrolytes and include a salt, base or acid dissolved in a solvent forming a solution that becomes the conductor of electricity. Some examples of chemicals which are electrolytes include sodium chloride, chloric acid, nitric acid, potassium nitrate, hydrochloric acid, potassium nitrate, sulfuric acid, sodium hydroxide, magnesium hydroxide and sodium acetate. Other materials, such as calcium, lithium, vanadium and zinc may also be dissolved in the electrolytes. It is noted that solids may be utilized for the catholyte and anolyte.

As discussed above, to construct a battery 1 according to the preferred embodiment of the invention, first an earthen-bore or well is provided. The bore or well may be newly formed or repurposed such as an oil or gas well. Next, the casing 9 may be inserted in to the well or bore 20. It is noted that it is foreseeable that the casing may not be utilized.

The outer tubular member 16 may be inserted into a well casing 9 or even a bore 20 without a casing. Coiled tubing may serve as the outer tubular member 16 and may be inserted a first length into the well using a work over rig. The first length may be the entire depth or length of the bore 20 or a relatively shorter distance. Next, the inner tubular member 8 may be inserted into the outer tubular member 16. Both the inner and outer tubular members 8, 16 may extend the length of the well 20 and/or casing 9. When inner and outer tubular members 8, 16 extend the length of the casing 9 or well 20, longitudinal section s 11 and 15 that also extend the length of the casing 9 or well 20.

Anode 13 and cathode 14 are then inserted into spaces 15 and 11 and suspended from the well head. More specifically, the anode 13 is suspended such that it contacts the outer surface of the tubular member 8, and the cathode 14 is suspended such that it contacts the inner surface of tubular member 8.

Next, the appropriate anolyte fluid and catholyte fluid is then inserted into the respective sections 15 and 11. Enough fluid is placed into sections 11, 15 such that each section 11, 15 is full of fluid through the bottom of the casing 9 or well 20 to the bore-head 5.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

The invention claimed is:

1. An energy storage device disposed in an earthen bore extending a first distance into earth, the device comprising:
   a bore-head inserted into the bore;
   an outer tubular member disposed in the bore, the outer tubular member surrounding an interior space, the outer tubular member forming a circumferential barrier between the interior space and the earth, and the outer tubular member extending at least the first distance into the earth;
   an inner tubular member disposed in the outer tubular member and extending the first distance, the inner tubular member being porous;
   a first liquid within the outer tubular member and external to the inner tubular member, the first liquid having a first charge; and
   a second liquid within the inner tubular member, the second liquid having a second charge being opposite the first charge.

2. The device of claim 1, wherein the inner tubular member includes an internal surface and an external surface, and further comprising:
   a first electrical terminal disposed in the first liquid and between the outer tubular member and the inner tubular member, and the first electrical terminal contacting the external surface of the inner tubular member; and
   a second electrical terminal extending into both the inner tubular member and the second liquid within the inner tubular member and the second electrical terminal contacting the internal surface of the inner tubular member.

3. The device of claim 2, wherein the first and second electrical terminals are configured to permit connection to a power grid.

4. The device of claim 1, further comprising:
   a first packer disposed in an upper portion of the bore-head; and
   a section of concrete disposed above the packer in the bore-head.

5. The device of claim 1, further comprising:
   a well casing extending into the bore and disposed between the outer tubular member and the earth, the well casing entirely surrounding the outer tubular member such that the outer tubular member is isolated from the earth.

* * * * *